(12) United States Patent
Yasutake et al.

(10) Patent No.: US 7,476,418 B2
(45) Date of Patent: Jan. 13, 2009

(54) METHOD FOR FABRICATING NANOMETER-SCALE STRUCTURE

(75) Inventors: Masatoshi Yasutake, Chiba (JP); Takashi Kaito, Chiba (JP); Yoshiharu Shirakawabe, Chiba (JP); Itaru Kitajima, Chiba (JP)

(73) Assignee: SII NanoTechnology Inc. (JP)

( * ) Notice: Subject to any disclaimer, the term of this patent is extended or adjusted under 35 U.S.C. 154(b) by 311 days.

(21) Appl. No.: 10/951,000

(22) Filed: Sep. 27, 2004

(65) Prior Publication Data

US 2005/0089463 A1   Apr. 28, 2005

(30) Foreign Application Priority Data

Oct. 3, 2003   (JP)   ............................. 2003-346061

(51) Int. Cl.
| | |
|---|---|
| *C23C 16/00* | (2006.01) |
| *B05D 3/06* | (2006.01) |
| *C23C 18/00* | (2006.01) |
| *C23C 18/14* | (2006.01) |
| *C23C 20/00* | (2006.01) |
| *C23C 8/00* | (2006.01) |
| *C23C 14/30* | (2006.01) |
| *H05B 7/00* | (2006.01) |

(52) U.S. Cl. ................. 427/249.1; 427/248.1; 427/581; 427/585; 427/596

(58) Field of Classification Search ...................... None
See application file for complete search history.

(56) References Cited

U.S. PATENT DOCUMENTS

| 6,555,945 | B1 * | 4/2003 | Baughman et al. | ........... 310/300 |
| 7,033,647 | B2 * | 4/2006 | Tang et al. | .................. 427/533 |
| 2002/0158480 | A1 * | 10/2002 | Nakayama et al. | ......... 294/99.1 |
| 2004/0009308 | A1 * | 1/2004 | Schlaf et al. | ................ 427/585 |

* cited by examiner

*Primary Examiner*—Timothy Meeks
*Assistant Examiner*—Kelly M Stouffer
(74) *Attorney, Agent, or Firm*—Adams & Wilks

(57) ABSTRACT

In a method for fabricating a nanometer-scale structure by arranging nanotubes in a predetermined direction at a predetermined position, the method for fabricating a nanometer-scale structure comprises a first step of planarizing a substrate by etching a predetermined part by irradiating a focused energy beam to the sample, a second step of decomposing and depositing an organic gas into a columnar structure with an objective of determining the position and direction, and a third step of attaching and fixing the nanotube by using the thus deposited columnar structure as a standard of position and direction.

24 Claims, 8 Drawing Sheets

METHOD FOR FABRICATING NANOMETER-SCALE STRUCTURE

BACKGROUND OF THE INVENTION

1. Technical Field

The present invention relates to a method for fabricating fine structures; particularly, it relates to a method for fabricating a nanometer-scale structure by using nanotubes represented by CNTs.

2. Background Art

Recently, single electron devices and mechanical filter devices are actively developed as next-generation devices, and carbon nanotubes (referenced hereinafter as "CNTs") are also used as the probes of atomic force microscopes (referenced hereinafter as "AFMs"). Nanotubes represented by CNTs are particularly important as a material for mechanically and electrically connecting those devices. In order to realize devices with improved functionality, it is required to control the position or the direction of attaching the nanotubes, or to assure contact thereof with the electrodes.

Nanotubes represented by CNTs are important as a material for the devices of next generation. An attempt of using CNTs as probes of AFMs has been made by H. Dai et al. (see, for example, non-patent reference 1). Furthermore, Nakayama et al. proposed a method of fixing CNTs by depositing carbon using electron beams (see, for example, patent reference 1). Furthermore, Nakayama et al. aligned CNTs in a cassette, and manipulated them under SEM (see, for example, non-patent reference 2).

Further, H. Dai et al. grew CNTs on an AFM probe by means of CVD growth method (see, for example, non-patent reference 3). In addition, as an example of fabricating a device using CNTs, C. Dekker et al. fabricated an intermolecular junction by bending, deflecting, crossing, or cutting CNTs on $SiO_2$ (see, for example, non-patent reference 4).

[Patent Reference 1]
Japanese patent Laid-open 2000-227435.
[Non-Patent Reference 1]
Nature, Vol. 384, 14 Nov. (1996).
[Non-Patent Reference 2]
J. Phys. D: Appl. Phys. 32, 1044-1048 (1999).
[Non-Patent Reference 3]
J. Kong, H. T. Soh, A. M. Cassel, C. F. Quate, H. Dai, Nature, 385, 879-881 (1998).
[Non-Patent Reference 4]
H. W. Ch. Postma, A. Sellmeijer, C. Dekker: Adv. Mater., 12, 17 (2000).

SUMMARY OF THE INVENTION

Conventionally, in case nanotubes represented by CNTs were to be fixed to a structure, they have been fixed by adhesion method (fixing by using adhesives or adhesive tapes), deposition method (deposition of carbon using electron beams), and the like. On the other hand, the position and the direction of the nanotubes to be fixed have been controlled by aligning them inside a SEM by using manipulators. Furthermore, in case nanotubes are used as interconnections and devices, not only the position and the direction should be controlled, but also electric conductivity should be assured between the structure (electrode) and the nanotubes. The methods proposed to the present are not satisfactory concerning the precision in the position of attachment and in the controllability of the angle, and the electric conductivity at the joint portion is still insufficient; accordingly, functions and performances of the structure require improvement.

The objectives of the present invention are to solve the problems above, and to provide a method for fabricating a nanometer-scale structure which is attachable to the structure without impairing the function and performance of the structure on attaching the nanotubes represented by CNTs to the structure.

A further objective of the present invention is to provide a method for fabricating a nanometer-scale structure capable of maintaining electric conductivity between the nanotubes represented by CNTs and the fine structure.

SUMMARY OF THE INVENTION

Figure 1:
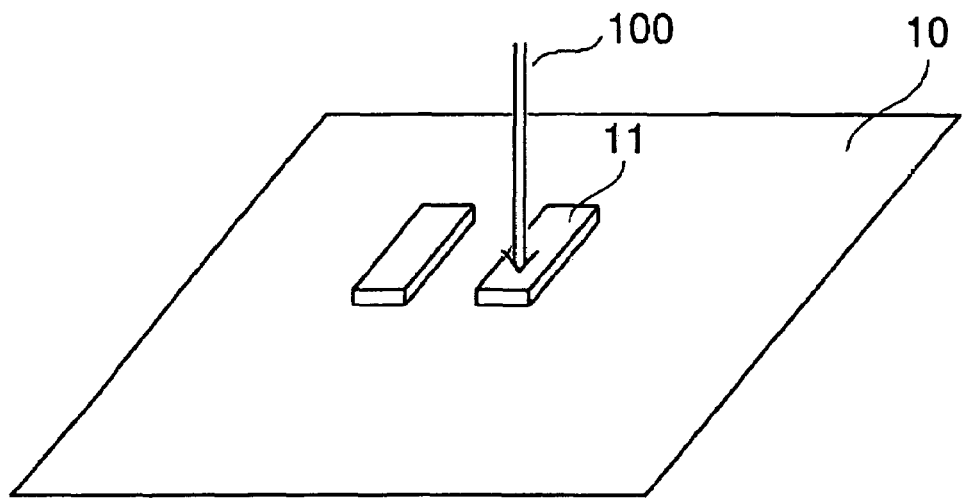
FIG. 1 is a schematic diagram showing a process for etching an electrode using an ion beam.

In order to solve the problems above, the present invention provides, in a method for fabricating a nanometer-scale structure by arranging nanotubes in a predetermined direction at a predetermined position, a first step of planarizing a substrate by etching a predetermined part of the sample by irradiating a focused energy beam thereto, a second step of decomposing and depositing an organic gas into a columnar structure with an objective of determining the position and direction, and a third step of attaching and fixing the nanotube by using the thus deposited columnar structure as a standard of position and direction.

Furthermore, the present invention comprises depositing, on the planarized surface of the substrate obtained on the first step above, a stage (foundation) which serves as a base of the deposition structure by using a focused energy beam and an organic gas.

Further, the present invention comprises using a focused ion beam as the focused energy beam.

Furthermore, the present invention comprises using a focused electron beam as the focused energy beam.

Moreover, the present invention comprises using as the raw material for the organic gas above, a hydrocarbon gas such as phenanthrene, or an organometallic gas such as $W(CO)_6$, $Cu(hfac)_2$ (where hfac: hexa-fluoro-acetyl-acetonate), $(CH_3)_2AlH$, $Al(CH_2—CH)(CH_3)_2$, $[(CH_3)_3Al]_2$, $(C_2H_5)_3Al$, $(CH_3)_3Al$, $(i-C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CH_3)_2$, $(CH_3)_4Sn$, $(C_2H_5)_4Sn$, $Nb(OC_2H_5)_5$, $Ti(i-OC_3H_7)_4$, $Zr(C_{11}H_{19}O_2)_4$, $La(C_{11}H_{19}O_2)_3$, $Sr(Ta(OC_2H_5)_6)_2$, $Sr(Ta(OC_2H_5)_5(OC_2H_4OCH_3))_2$, $Mn(Oi-C_3H_7)_2Zr(OtC_4H_9)$, $Zr(OiC_3H_7)$, $Ti(OiC_3H_7)_2(C_{11}H_{19}O_2)_2$, $Ta(OiC_3H_7)$, $Nb(OiC_3H_7)$, $Ge(OC_2H_5)$, $Pt(C_5H_4C_2H_5)(CH_3)_3$, $Ti(N(CH_3))_4$, $Ti(N(C_2H_5)_2)_4$, $Fe(OCH_3)_3$, $Ga(OCH_3)$, $Hf(OCH_3)_4$, $In(OCH_3)_3$, $Si(OC_2H_5)$, $Yb(OiC_3H_7)$, and $Zn(OCH_3)_3$.

Further, the present invention comprises obtaining the columnar structure in the second step by scanning or by repeatedly scanning the focused energy beam in the planar direction of the substrate, thereby decomposing the thus introduced organic gas and depositing the residue to allow it grow in the planar direction of the substrate.

Still further, the present invention comprises obtaining the columnar structure in the second step by scanning or by repeatedly scanning the focused energy beam in the planar direction of the substrate, from a direction tilted in either upper or lower side with respect to the planar direction of the substrate, or to a state in which the substrate is tilted, thereby decomposing the thus introduced organic gas and depositing the residue to allow it grow in the upper or lower direction of the substrate.

Moreover, the present invention comprises obtaining the columnar structure in the second step above, by fixing the focused energy beam, such that it may be irradiated in such a manner that the direction of incident beam should be vertical or tilted at a constant angle with respect to the surface of the sample, thereby decomposing the thus introduced organic gas and depositing the residue to allow it grow vertically or tilted at a constant angle with respect to the surface of the sample.

Furthermore, the present invention provides the nanometer-scale structure as a probe of a probe microscope.

Further, the present invention provides the nanometer-scale structure as a mechanical filter element.

In addition, the present invention provides a method for fabricating a nanometer-scale structure, comprising a first step of planarizing the substrate by arranging nanotubes in a predetermined direction at a predetermined position and irradiating focused energy beam to the sample with an objective of fabricating a nanometer-scale structure by etching the predetermined part and the surroundings thereof, a second step of decomposing and depositing an organic gas into a columnar structure with an objective of determining the position and direction, a third step of attaching and fixing the nanotube by using the thus deposited columnar structure (pillar) as a standard of position and direction, and a fourth step of imparting electrical conductivity to the attached nanotube between an electrode.

Further, the present invention comprises using as a means for implementing the fourth step, coating a low melting point metal to the joint part while controlling the temperature of the electrode substrate, thereby improving the electric conductivity.

Furthermore, the invention of the present invention comprises using as the low melting point metal, metals such as Ga and In, or alloys such as a solder.

Moreover, the invention of the present invention comprises, as the coating method above of the low melting point metal, attaching a probe covered with said low melting point metal to an atomic force microscope (AFM), bringing the probe into contact with the joint part, and applying electric field between the joint part and the probe covered with the low melting point metal, thereby allowing the low melting point metal to move and deposit on the joint part.

Furthermore, the present invention provides the nanometer-scale structure as a connecting wire among two or more facing electrodes.

Further, the present invention provides the nanometer-scale structure as an active element consisting of a connecting wire among two or more facing electrodes and a gate electrode.

Additionally, the present invention provides the nanometer-scale structure as a probe of a probe microscope.

Furthermore, the present invention comprises, in the third step, coating a catalyst on the pillar, and growing nanotubes along the pillar by vapor phase chemical reaction.

Further, the present invention comprises, in the third step, depositing a catalyst on the pillar by means of ion beam deposition, and growing nanotubes along the pillar by vapor phase chemical reaction.

[Advantage of the Invention]

By using the method for fabricating a nanometer-scale structure, the position and the direction of the nanotubes to be fixed as well as the electric conductivity can be controlled; accordingly, the fabrication of mechanical and electric devices using nanotubes can be more easily accomplished.

DETAILED DESCRIPTION OF THE INVENTION

In the method for fabricating a nanometer-scale structure according to the present invention, a deposition product having predetermined position of attachment and direction is fabricated at a predetermined position and in a predetermined direction in the step prior to the attachment, so that the nanotube may be attached thereto, and the nanotube is attached by using this deposition product as a guide. The scheme of the process is shown below.

(1) Planarizing the surface of a structure (electrode) by etching process, comprising irradiating a focused energy beam in scan mode to a predetermined part of the surface of the sample.

(2) Then, ejecting an organic gas/organometallic gas from a gas gun and depositing metal on the thus processed surface with high adhesion strength, thereby forming a stage. This process step may be omitted.

(3) Subsequently, the direction of incidence or the tilting of the stage is adjusted in such a manner that a carbon or metal pillar is grown at a predetermined position and direction.

(4) Then, by manual manipulation or by CVD growing, the position and the direction of attaching the carbon nanotube are controlled by using the pillar as a guide.

(5) If necessary, additional deposition of the organometal using ion beam or of carbon using electron beam is conducted to fix the nanotube.

(6) If necessary, a low melting point metal is coated on the joint part to improve electric conductivity.

By carrying out the process above, it is possible to embed a nanotube in a structure with its position and direction controlled, or to implement an interconnection using a nanotube with its position and direction regulated.

EXAMPLES

Examples below are given for a case of fabricating an interconnection for CNTs, in which the pillar above is grown along the planar direction by using focused ion beam, and for a case of fabricating a tip of an AFM, in which the pillar above is grown in the vertical direction.

Example 1

Interconnection for CNTs

Because CNTs have excellent electric conductivity with small scattering of electrons during conduction, they are ideal materials for interconnections and devices of the next generation. However, a method for interconnecting CNTs by controlling the position and the direction thereof between the electrodes, while maintaining good conductivity, is yet to be established (see non-patent reference 4).

As an example, a method according to the present invention for using CNTs for connecting in-plane electrodes is described below by referring to FIGS. 1 to 6.

Figure 2:
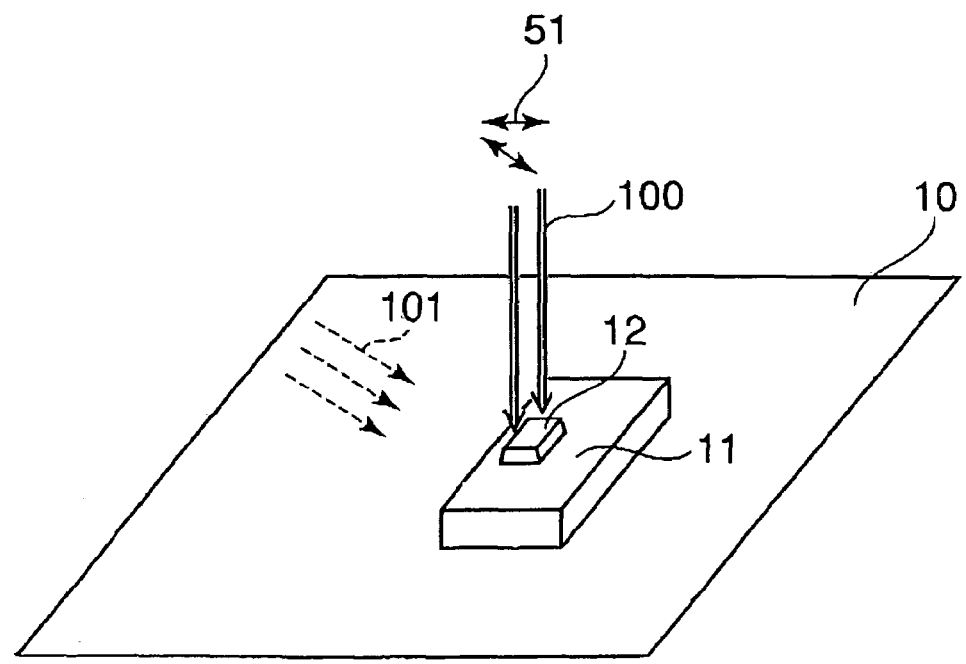
FIG. 2 is a schematic diagram showing a process of fabricating a foundation on the electrode by means of ion beam deposition.
Figure 3:
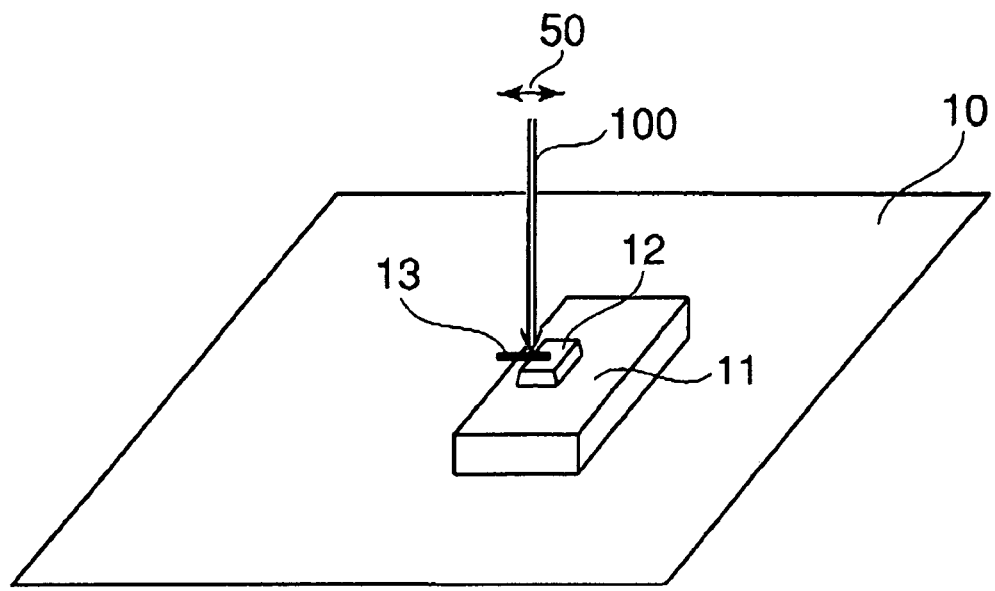
FIG. 3 is a schematic diagram showing a process of fabricating a column (pillar) on the foundation by ion beam deposition.
Figure 4:
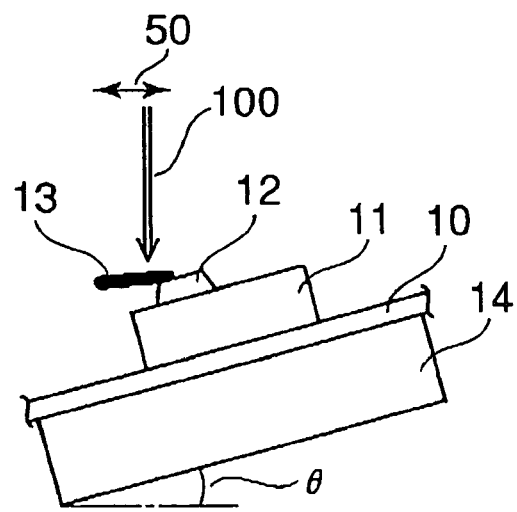
FIG. 4 is a schematic diagram showing a process of fabricating a tilted column (pillar) on the foundation by ion beam deposition.
Figure 5:
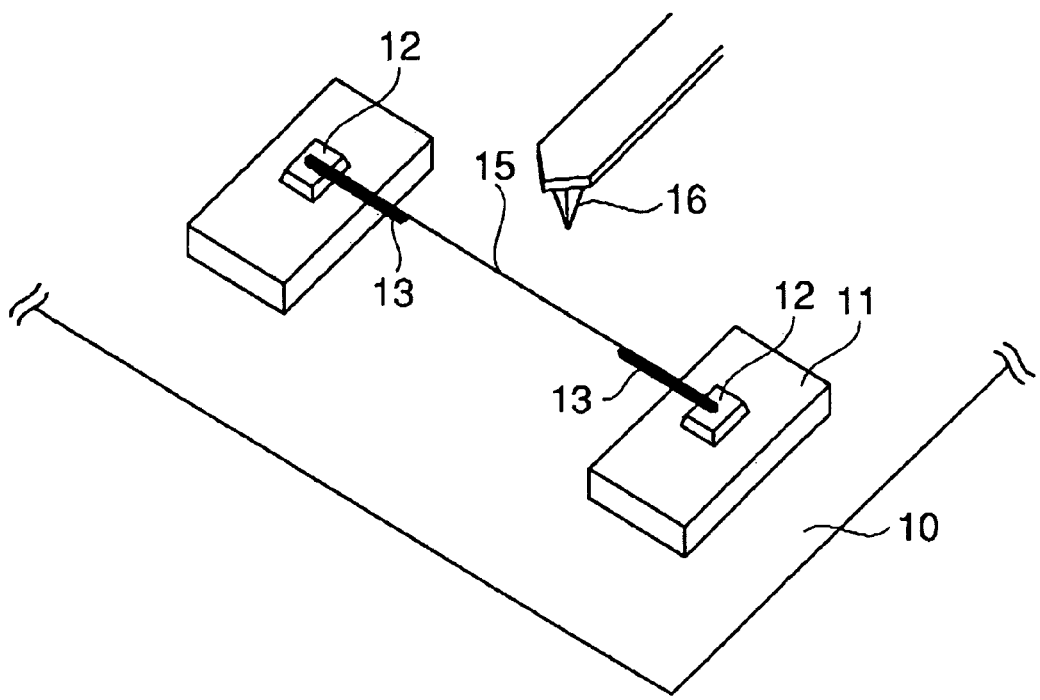
FIG. 5 is a diagram showing a process of attaching a nanotube between two pillars.
Figure 6:
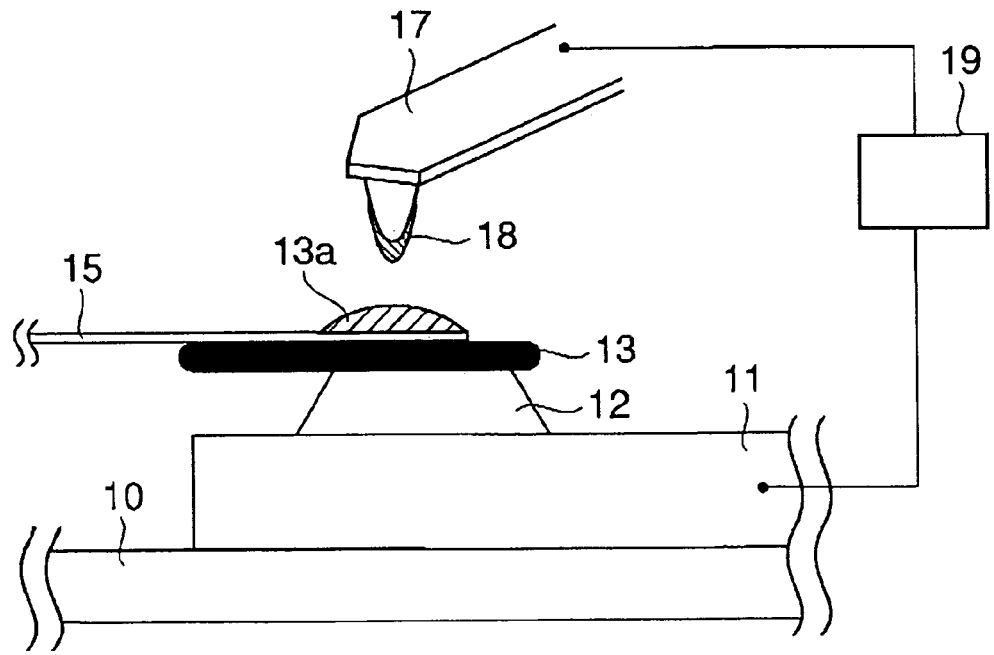
FIG. 6 is a diagram showing the cross section view of the joint part of the electrode according to the present invention and a concept of an apparatus constituting a system for coating a low melting point metal.

FIG. 1 is a schematic diagram showing a process for etching an electrode using ion beam. FIG. 2 is a schematic diagram showing a process of fabricating a foundation on the electrode by means of ion beam deposition. FIG. 3 is a schematic diagram showing a process of fabricating a column (pillar) on the foundation by ion beam deposition. FIG. 4 is a schematic diagram showing a process of fabricating a tilted column (pillar) on the foundation by ion beam deposition. FIG. 5 is a diagram showing a process of attaching a nanotube between two pillars. FIG. 6 is a diagram showing the cross section view of the joint part of the electrode according to the present invention and the concept of an apparatus constituting a system for coating a low melting point metal.

The process step shown in FIG. 1 comprises carrying out an etching process inside a focused ion beam (FIB) chamber, in which a focused ion beam 100 is irradiated to a predetermined part of a structure (electrode) 11 provided on a substrate 10. By this process, the oxide layer on the surface of the electrode or the insulating film on the surface is removed to expose the intrinsic surface or the electrically conductive surface. Furthermore, beam is scanned for planarizing treatment of the processed surface. These treatments are carried out in order to assure electric conductivity and to enhance adhesive strength with the substrate.

The process shown in FIG. 2 comprises ejecting an organometallic gas 101, decomposing it with an ion beam 100 scanned in XY directions as shown by the scanning direction 51, and depositing metal to the etching-treated predetermined part, to thereby form a stage or foundation 12. The stage 12 improves the adhesiveness of the structure (electrode) 11 on which the metal has been deposited, and is also provided to improve adhesiveness with the pillar 13 that is formed in the later stage. This step may be omitted.

As the types of the organometallic gases 101, there can be mentioned $W(CO)_6$, $Cu(hfac)_2$ (where hfac: hexa-fluoro-acetyl-acetonate), $(CH_3)_2AlH$, $Al(CH_2-CH)(CH_3)_2$, $[(CH_3)_3Al]_2$, $(C_2H_5)_3Al$, $(CH_3)_3Al$, $(i-C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CH_3)_2$, $(CH_3)_4Sn$, $(C_2H_5)_4Sn$, $Nb(OC_2H_5)_5$, $Ti(i-OC_3H_7)_4$, $Zr(C_{11}H_{19}O_2)_4$, $La(C_{11}H_{19}O_2)_3$, $Sr(Ta(OC_2H_5)_6)_2$, $Sr(Ta(OC_2H_5)_5)(OC_2H_4OCH_3))_2$, $Mn(OiC_3H_7)_2Zr(OiC_4H_9)$, $Zr(OiC_3H_7)$, $Ti(OiC_3H_7)_2$, $(C_{11}H_{19}O_2)_2$, $Ta(OiC_3H_7)$, $Nb(OiC_3H_7)$, $Ge(OC_2H_5)$, $Pt(C_5H_4C_2H_5)(CH_3)_3$, $Ti(N(CH_3))_4$, $Ti(N(C_2H_5)_2)_4$, $Fe(OCH_3)_3$, $Ga(OCH_3)$, $Hf(OCH_3)_4$, $In(OCH_3)_3$, $Si(OC_2H_5)$, $Yb(OiC_3H_7)$, and $Zn(OCH_3)_3$.

In the step shown in FIG. 3, the ion beam 100 is slowly scanned in the planar direction as shown by the scanning direction 50, so that the pillar 13 should be grown along the direction of attaching CNT. The pillar 13 may be obtained by depositing the same metal as that of the foundation 12, or may be a different metal or carbon. Concerning the shape and the controlling of the pillar 13, the length thereof depends on the scanning range of the ion beam 100.

In the step shown in FIG. 4, in case the pillar 13 is formed on the upper side of the foundation 12 at an attachment angle θ with respect to the foundation 12, the stage 14 is tilted by an angle θ. In this manner, the pillar 13 is formed tilted on the upper side, and by attaching a pre-formed nanotube 15 to the pillar 13, a hanging interconnection of nanotubes 15 is implemented apart from the substrate 10.

FIG. 5 shows a step of attaching the pre-formed nanotube 15 to the pillar 13 grown above. In this step, by using a probe 16 of an AFM, for example, the nanotube 15 is moved between the pillars 13 and 13 that have been grown on two electrodes 11 and 11 on the substrate 10 so that the nanotube 15 extends lengthwise with respect to each of the pillars 13, 13. In case the nanotube 15 approaches one of the pillars 13, it is adsorbed to the pillar 13 due to Van der Waals force. In this state, the one end of the nanotube may be fixed by using one of the fixing methods shown in section 5) below. Similarly, the other end of the carbon tube is fixed in the same manner above by bringing it in the vicinity of the other pillar 13 by using the AFM probe 16. In this manner, the operation of passing the nanotube 15 between the two pillars 13 and 13 is accomplished.

The process shown in FIG. 6 comprises fixing the pillar 13 above with the nanotube 15. In case no electric conductivity is required between the electrode 11 and the nanotube 15, carbon may be deposited on the nanotube 15 inside an SEM; however, in case electric conductivity is required, an organometal 13a may be deposited on the nanotube 15 that has been adhered to the pillar 13 inside the FIB chamber.

Furthermore, in order to obtain favorable electric conductivity between the electrode 11 and the nanotube 15, the pillar 13 and the nanotube 15 are fixed by an ion beam 100, and a cantilever 17 having adhered thereto a low melting point metal 18 is attached to the AFM apparatus while controlling the temperature of the substrate 10. subsequently, the front edge of the probe is brought in the vicinity of the joint part of the pillar 13 and the nanotube 15, and an electric field is applied between the front edge and the joint part by applying electric potential in pulses by a power source 19, so that the low melting point metal 18 melts and adheres to the joint between the pillar 13 and the nanotube 15. As the low melting point metals, usable are metals such as Ga and In, or alloys such as solders.

By the process described above, a nanotube 15 can be fixed at predetermined positions and in predetermined direction between two electrodes 11 and 11, while assuring electric conductivity between the electrodes 11 and the nanotube 15. As an example, description has been given on a case of passing the nanotube 15 between the electrodes 11 and 11, in which the nanotube 15 is used as the interconnection material.

The use of CNT as an interconnection material is not limited to above, and as an application of an active device using nanotubes 15, a MOS configuration device is also proposed, which comprises using the nanotube 15 for an interconnection between the two electrodes 11 and 11 above; in this case, each of the electrodes 11 and 11 are connected to a source and a drain, respectively, while providing a gate electrode to the lower part of the naonotube 15. By using the method described above, it is possible to fix the nanotube 15 at a predetermined position and direction.

Furthermore, the structure shown in FIG. 5 comprises a nanotube 15 fixed at both ends, such that the nanotube 15 vibrates at the resonant frequency depending on its length. Thus, it functions as a filter for extracting a predetermined range of frequencies by mechanical resonant vibration.

Example 2

Fixing Nanotubes to the Tip of AFM

As another example of the present invention, an example of fixing the nanotube to the tip of an AFM is described below. The nanotube represented by CNT has excellent characteristics as a tip for AFMs, such as having (1) fine probe diameter, (2) high aspect (the ratio of length to diameter), (3) high durability, (4) chemical stability, and (5) excellent electric resistance.

As examples of using the CNT as a probe for AFM, there can be mentioned prior art described in non-patent reference 1 and non-patent reference 3, however, the controllability of the position of attaching the CNT and the electric conductivity is limited. On the other hand, the market need on the trench for use in isolation of devices is approximately 100 nm in width and approximately 1 μm in depth.

In order to accurately measure the shape, it is necessary to fix the AFM probe vertically with respect to the surface of the sample (wafer). An example of attaching the AFM probe at an accurate angle by using ion beam and organometallic gas is shown below. The details of the procedure of attaching the probe are shown in FIGS. 7 to 11.

Figure 7:
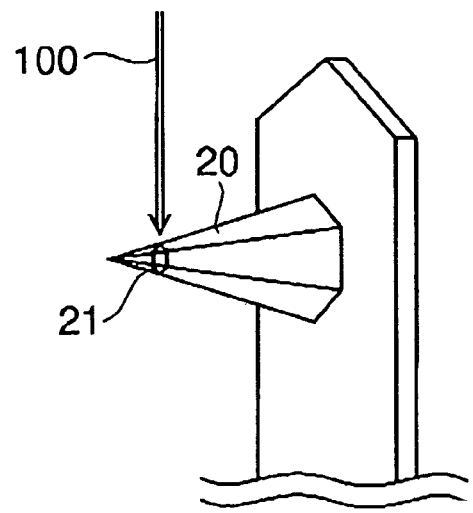
FIG. 7 is a schematically drawn diagram showing the process of cutting the front edge of the probe attached to a cantilever.
Figure 8:
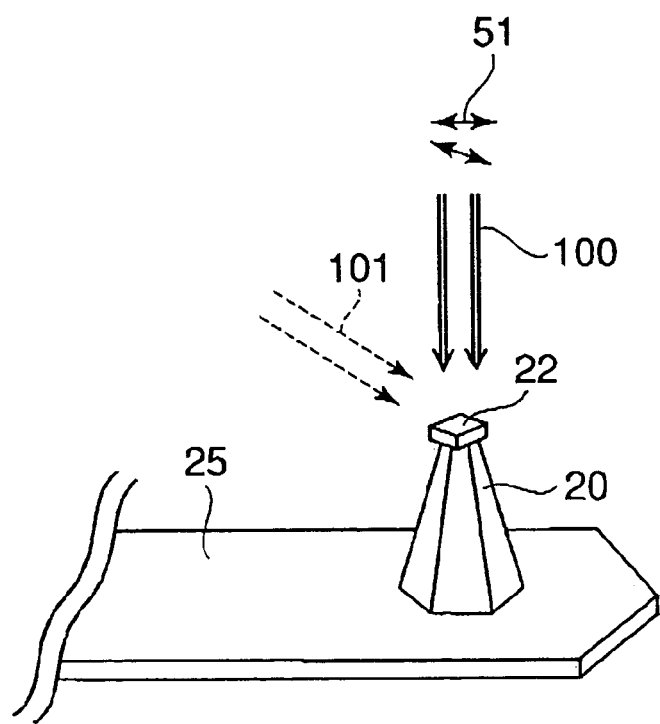
FIG. 8 is a schematically drawn diagram showing the process of forming a foundation on the front edge of the probe by ion beam deposition.
Figure 9:
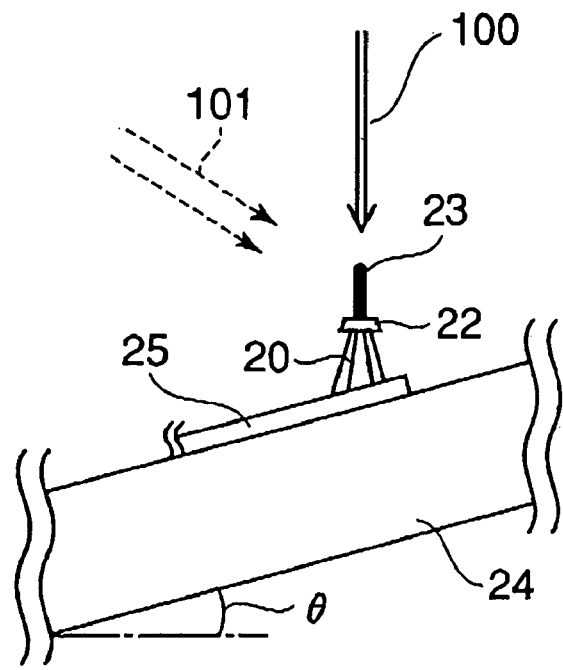
FIG. 9 is a schematically drawn diagram showing the process of forming a column (pillar) tilted by an angle of θ by means of ion beam deposition.
Figure 10:
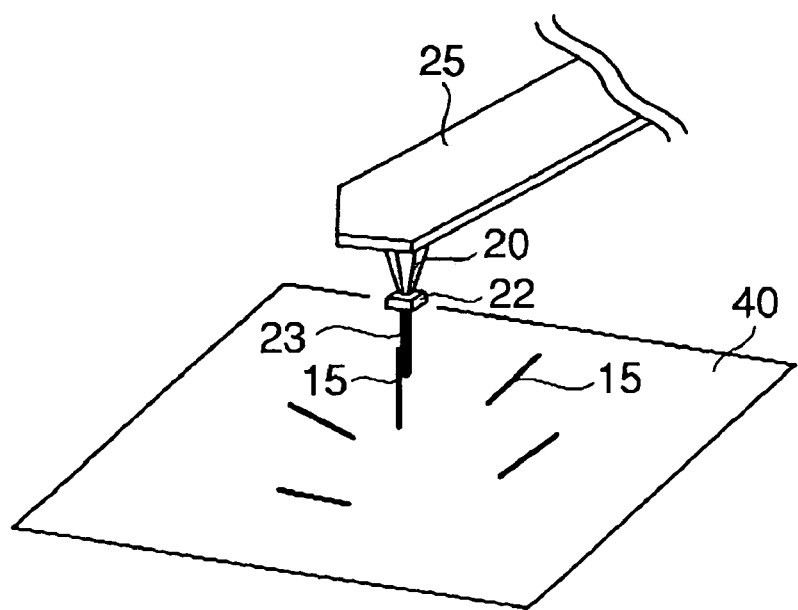
FIG. 10 is a schematically drawn diagram showing the process of picking up a nanotube to the pillar part.
Figure 11:
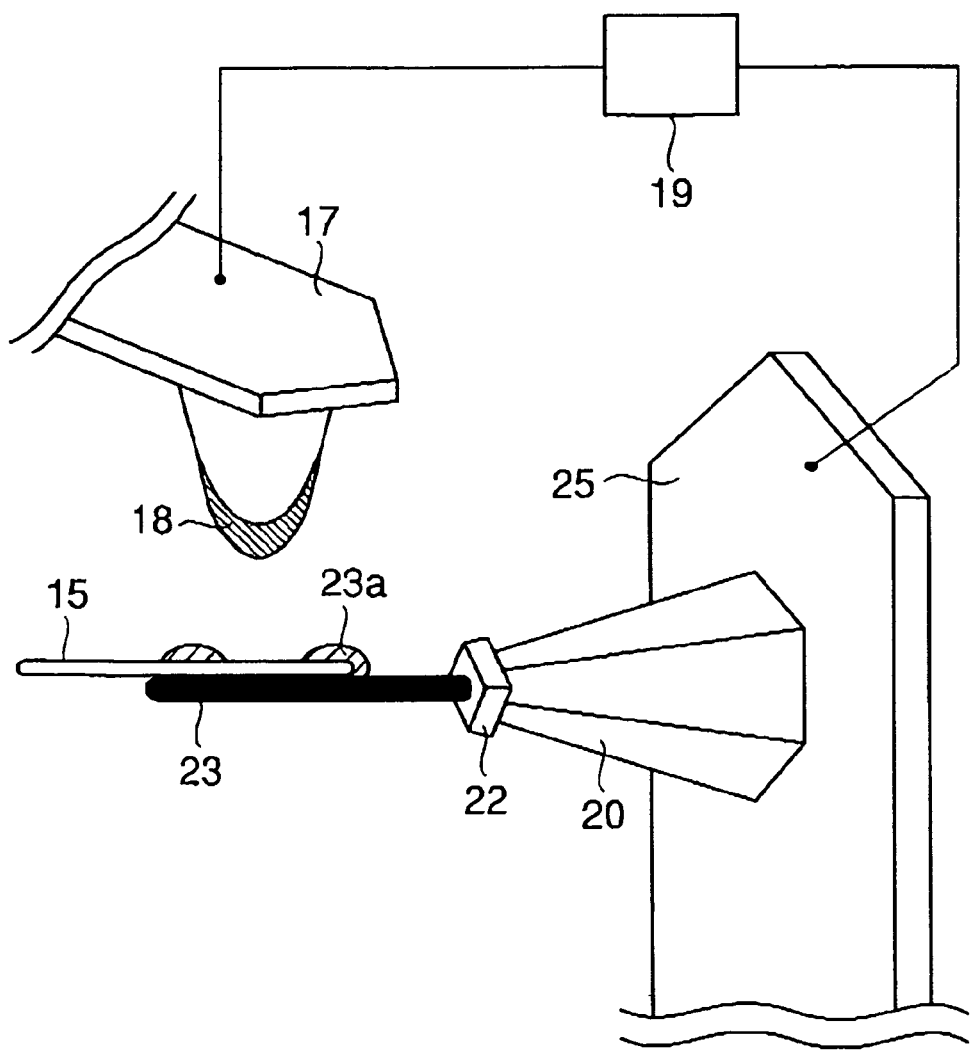
FIG. 11 is a conceptual diagram showing the probe joint part fabricated by the present invention and the apparatus constituting a system for coating low melting point metal.

FIG. 7 is a schematically drawn diagram showing the process of cutting the front edge of the probe attached to a cantilever. FIG. 8 is a schematically drawn diagram showing the process of forming a foundation on the front edge of the probe by ion beam deposition. FIG. 9 is a schematically drawn diagram showing the process of forming a column (pillar) tilted by an angle of θ by means of ion beam deposition. FIG. 10 is a schematically drawn diagram showing the process of picking up a nanotube to the pillar part. FIG. 11 is a conceptual diagram showing the probe joint part fabricated by the present invention and the apparatus constituting a system for coating low melting-point metal.

In the process shown in FIG. 7, the front edge of the probe 20 using silicon or silicon nitride as the mother material is cut by a focused ion beam 100 to form a planarized part 21. By this process, the intrinsic surface can be obtained, so that a flat plane necessary for growing thereon a pillar 23 (see FIG. 9) having strong adhesion force can be implemented.

In the process shown in FIG. 8, an organometallic gas 101 is ejected to the cut out plane, and by decomposing it with an XY scanning ion beam 100 shown by the scanning direction 51, metal is deposited on a predetermined part subjected to the etching treatment, such that a foundation 22 is fabricated. However, this process step may be omitted. Usable as the types of organometallic gases 101 are the same as those described in Example 1.

In the process shown in FIG. 9, a pillar 23 is grown on the foundation 22 above. The direction of incidence of the ion beam 100 is adjusted as such that it may be vertical to the sample-plane, and the tilting angle θ of the sample-stage 24 is adjusted to specify the growth angle of the pillar 23. The pillar 23 may be obtained by depositing the same metal as that used for the foundation 22, or a different metal or carbon. The shape of the pillar 23 can be controlled; the length can be controlled by the duration of irradiating the ion beam 100, and the angle of attachment can be controlled by the direction of irradiating the ion beam 100 and the tilting angle θ of the stage 24.

In case of growing tungsten, for instance, $W(CO)_6$ is used as the organometallic gas 101, and the ion beam current is about 1 pA. The diameter of the pillar 23 is around 50 to 100 nm. In order to further improve the angle of attaching the CNT, two pillars 23 may be grown in parallel with each other so that they may be used as guides, and the concave part of the two guide pillars 23 and 23 may be used as a groove for fixing the CNT.

<Manual Assembly>

FIG. 10 is a diagram showing a process for attaching a nanotube 15 to pillars 23 grown above. In this process, a cantilever 25 having a pillar 23 grown thereon is assembled on an AFM, and a nanotube 15 is hung up from a substrate having plural nanotubes 15 scattered thereon. In case the pillar 23 approaches a nanotube 15, the nanotube 15 is adsorbed by the pillar 23 by Van der Waals force.

As another method, there can be mentioned a method as shown in Patent reference 1, in which the cantilever 25 is fixed to a manipulator inside an SEM, and the nanotubes 15 arranged on a cassette may be hung up by the pillar 23 above. In both cases, the angle of attaching the CNT corresponds to the angle of attachment of the pillar 23 if the nanotube 15 is attached along the mother line of the cylindrical pillar 23, or is placed inside the guiding groove as described in the process related to FIG. 9.

FIG. 11 is a diagram showing a process for fixing the nanotube 15 to the pillar 23. In case no electric conductivity is required between the foundation 22 and the nanotube 15, carbon may be deposited on the nanotube 15 inside an SEM as described in the method of non-patent reference 2. However, in case electric conductivity is necessary between the foundation 22 and the nanotube 15, a metal-coated cantilever 25 may be used as a mother material to have an organometal 23a deposited thereon inside an FIB chamber.

A further favorable electric conductivity can be attained between the foundation 22 and the nanotube 15 by a method comprising fixing the nanotube 15 to the pillar 23 using an ion beam 100, fixing a cantilever 25 having attached thereon the nanotube 15 to a substrate, and, while controlling the temperature of the substrate, bringing the front edge of another cantilever 17 having attached thereon the low melting point metal 18 in close contact with the joint part of the pillar 23 and the nanotube 15; and between the cantilever 25 having attached thereon the nanotube 15 and the cantilever 17 having attached thereon the low melting point metal 18, an electric field is applied by applying electric potential in pulses by the power source 19, so that the low melting point metal 18 is adhered to the joint part of the pillar 23 and the nanotube 15.

Example 3

Growing CNT by CVD

Another method for growing CNT by chemical vapor deposition (CVD) on a pillar by ion beam deposition is described below. A method for growing CNT on the probe of an AFM using CVD growth is proposed in non-patent reference 3, but according to this method, the direction of growth of CNT cannot be controlled, and hence, the product was unfeasible as an AFM probe.

The process is described below by making reference to FIGS. 12 to 14. The process steps (1) to (3) are the same as described before. However, since the process of CVD growth reaches to a temperature as high as around 900° C., the material of the pillar to be grown is preferably carbon or tungsten.

Figure 12:
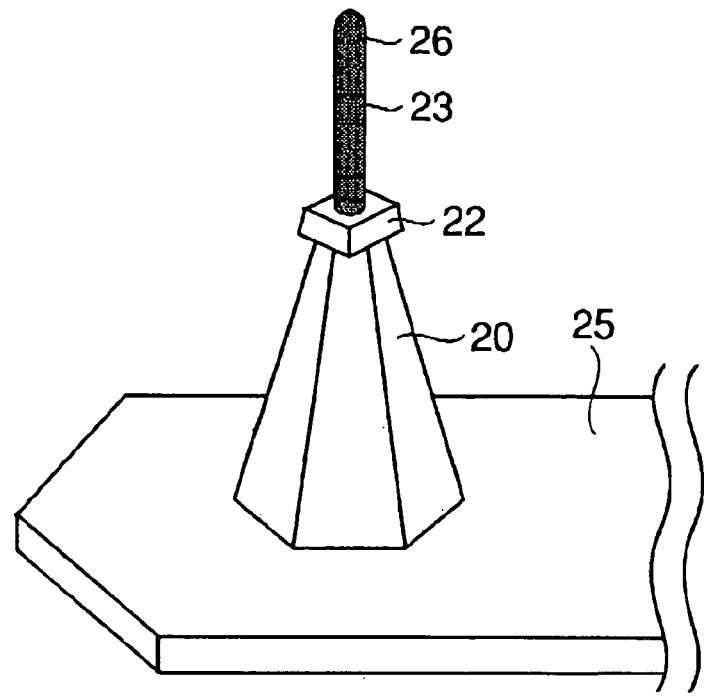
FIG. 12 is a schematic diagram showing the process state in which a catalyst is vapor deposited on the cantilever.
Figure 13:
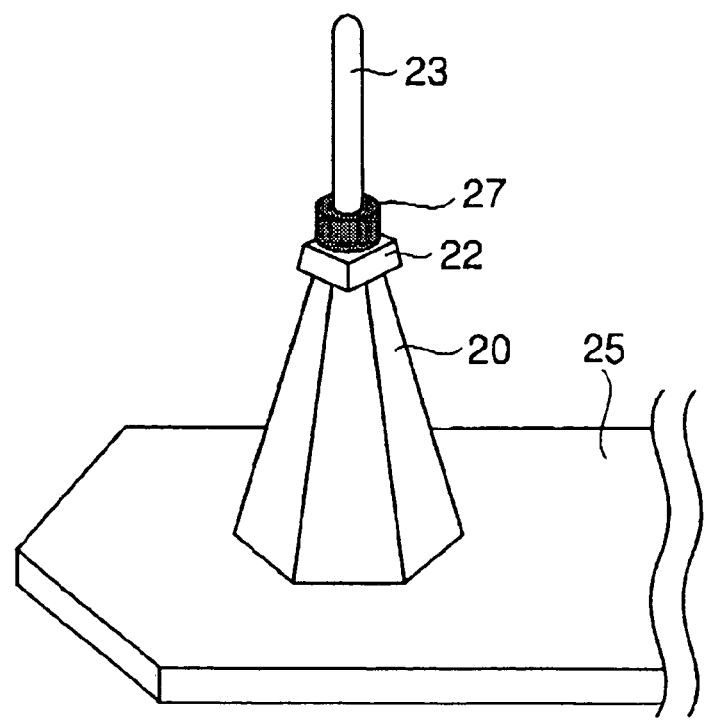
FIG. 13 is a schematic diagram showing the process state in which a catalyst is deposited on a cantilever by ion beam deposition.

FIG. 12 is a schematic diagram showing the process state in which a catalyst is vapor deposited on the cantilever. FIG. 13 is a schematic diagram showing the process state in which a catalyst is deposited on a cantilever by ion beam deposition. FIG. 14 is a schematic diagram showing the process state in which CNTs are grown along the pillar from the catalyst.

The process step shown in FIG. 12 corresponds to a step of attaching a catalyst 26 for nanotubes, such as fine particles of nickel or iron based metals, to the pillars 23 grown above. In this process, the cantilever 25 is coated with fine catalyst particles by means of vacuum evaporation and sputtering. Otherwise, as shown in FIG. 13, an organometallic gas, i.e., $Ni(CO)_4$, $Fe(OCH_3)_3$, and $Fe(CO)_4$, may be ejected, and by irradiating an ion beam to the lower part of the pillar 23, Ni or Fe catalyst 27 can be deposited.

Figure 14:
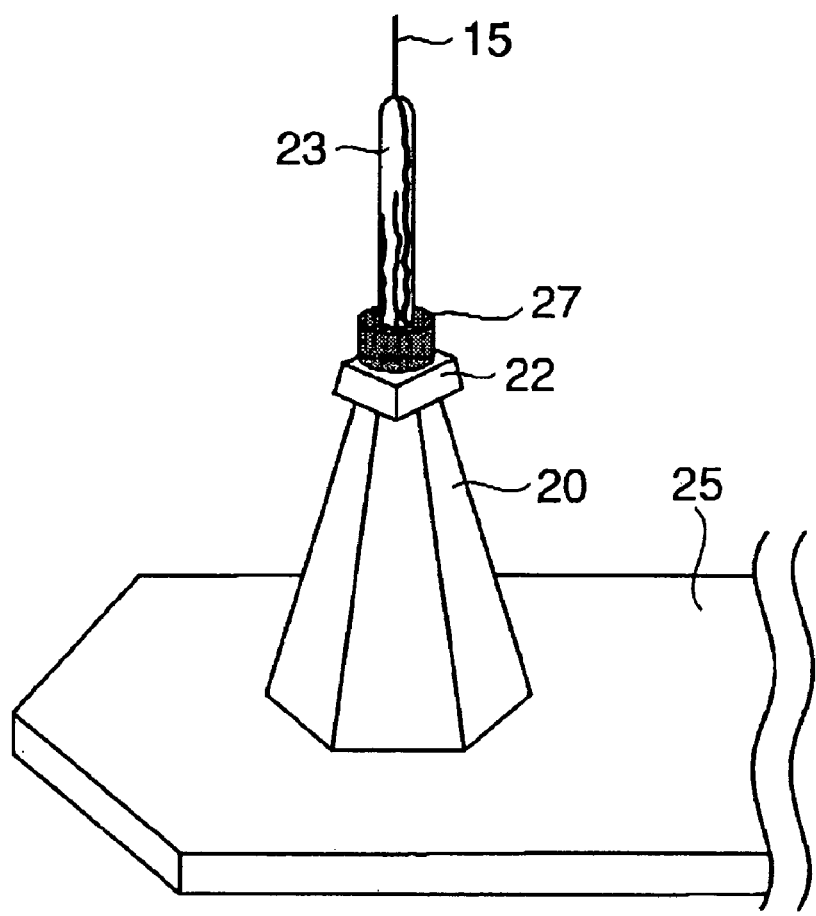
FIG. 14 is a schematic diagram showing the process state in which CNTs are grown along the pillar from the catalyst.

The process shown in FIG. 14 is the growth process of nanotubes 15 from the pillar 23. The cantilever 25 having a pillar with a catalyst 27 attached thereon is introduced inside a CVD furnace. Then, nanotubes 15 can be grown by introducing hydrocarbon gases to the CVD furnace under controlled temperature and flow rate. The nanotubes 15 grown from the catalyst 27 grow along the pillar 23 because of the Van der Waals force therebetween.

Thus, the direction of growth can be regulated by the pillar 23. The growth length of the nanotube 15, i.e., CNT, is controlled by the flow rate of the hydrocarbon gas and the temperature of the reaction furnace. For instance, in case methane is used as the gas, the temperature of the CVD furnace is around 900° C.

Further, in case plural CNTs grow out from the front edge part of the pillar 23, the cantilever 25 is placed inside an FIB chamber, and an ion beam is irradiated to unwanted CNTs to leave the necessary number of CNTs. In this manner, CNT grown along the pillar 23 can be obtained with regulated angle of attachment.

INDUSTRIAL APPLICABILITY

According to the present invention, nanotubes, which are represented by carbon nanotubes, having controlled angle of attachment and direction, capable of being joined with electrodes or attached as AFM probes, can be obtained, so that they may be used for interconnection of devices of next generation and for fabricating nanometer scale structures. Thus, the present invention is of great contribution to various types of devices.

What is claimed is:

1. A method for fabricating a nanometer-scale structure, the method comprising: a first step of etching a predetermined part of a substrate using a focused energy beam to form a planar surface on the substrate; a second step of decomposing and depositing an organic gas, using a focused energy beam, to form an axially extending columnar structure on the planar surface of the substrate; and a third step of attaching and fixing a pre-formed nanotube to the columnar structure so that the nanotube extends axially in the same direction as the columnar structure.

2. A method for fabricating a nanometer-scale structure, the method comprising: a first step of decomposing and depositing an organic gas using a focused energy beam to form a foundation on a planar surface of a substrate; a second step of decomposing and depositing an organic gas, using a focused energy beam, to form an axially extending columnar structure on a predetermined part of the foundation; and a third step of attaching and fixing a pre-formed nanotube to the columnar structure so that the nanotube extends axially in the same direction as the columnar structure.

3. A method for fabricating a nanometer-scale structure as claimed in claim 1 or 2;
wherein the focused energy beam is a focused ion beam.

4. A method for fabricating a nanometer-scale structure as claimed in claims 1 or 2;
wherein the focused energy beam is a focused electron beam.

5. A method for fabricating a nanometer-scale structure as claimed in claim 1 or 2;
wherein the raw material for the organic gas is phenanthrene or one of $W(CO)_6$, $Cu(hfac)_2$ (where hfac: hexafluoro-acetyl-acetonate), $(CH_3)_2AlH$, $Al(CH_2—CH)(CH_3)_2$, $[(CH_3)_3Al]_2$, $(C_2H_5)_3Al$, $(CH_3)_3Al$, $(i-C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CR_3)_2$, $(CR_3)_4Sn$, $(C_2H_5)_4Sn$, $Nb(OC_2H_5)_5$, $Ti(i-OC_3H_7)_4$, $Zr(C_{11}H_{19}O_2)_4$, $La(C_{11}H_{19}O_2)_3$, $Sr(Ta(OC_2H_5)_6)_2$, $Sr(Ta(OC_2H_5)_5(OC_2H_4OCH_3))_2$, $Mn(OiC_3H_7)_2Zr(OtC_4H_9)$, $Zr(OiC_3H_7)$, $Ti(OiC_3H_7)_2(C_{11}H_{19}O_2)_2$, $Ta(OiC_3H_7)$, $Nb(OiC_3H_7)$, $Ge(OC_2H_5)$, $Pt(C_5H_4C_2H_5)(CH_3)_3$, $Ti(N(CH_3))_4$, $Ti(N(C_2H_5)_2)_4$, $Fe(OCH_3)_3$, $Ga(OCH_3)$, $Hf(OCH_3)_4$, $In(OCH_3)_3$, $Si(OC_2H_5)$, $Yb(OiC_3H_7)$, and $Zn(OCH_3)_3$.

6. A method for fabricating a nanometer-scale structure as claimed in claim 1 or 2;
wherein the columnar structure in the second step is formed by scanning or by repeatedly scanning the focused energy beam in the planar direction of the substrate, thereby decomposing the organic gas and depositing the decomposed residue so that it grows in the planar direction of the substrate.

7. A method for fabricating a nanometer-scale structure as claimed in claim 1 or 2;
wherein the columnar structure in the second step is formed by scanning or by repeatedly scanning the focused energy beam in the planar direction of the substrate, either from a tilted upper or lower direction with respect to the planar direction of the substrate, or in a state in which the substrate is tilted, thereby decomposing the organic gas and depositing the decomposed residue so that it grows in the upper or lower direction of the substrate.

8. A method for fabricating a nanometer-scale structure as claimed in claim 1 or 2;
wherein, in the second step, the columnar structure is formed by fixing the focused energy beam so that it is irradiated in such a manner that the direction of the incident focused energy beam is vertical or tilted at a constant angle with respect to the surface of the substrate, thereby decomposing the organic gas and depositing the decomposed residue so that it grows vertically or tilted at a constant angle with respect to the surface of the substrate.

9. A method for fabricating a nanometer-scale structure as claimed in claim 1 or 2;
wherein the nanometer-scale structure is a probe of a probe microscope.

10. A method for fabricating a nanometer-scale structure as claimed in claim 1 or 2;
   wherein the nanometer-scale structure is a mechanical filter element.

11. A method for fabricating a nanometer-scale structure, the method comprising: a first step of etching a predetermined part of a substrate using a focused energy beam to form a planar surface on the substrate;
   a second step of decomposing and depositing an organic gas, using a focused energy beam, to form an axially extending columnar structure on the planar surface of the substrate; a third step of attaching and fixing a pre-formed nanotube to the columnar structure so that the nanotube extends axially in the same direction as the columnar structure; and a fourth step of imparting electrical conductivity between the attached nanotube and an electrode.

12. A method for fabricating a nanometer-scale structure, the method comprising a first step of decomposing and depositing an organic gas using a focused energy beam to form a foundation on a planar surface of a substrate; a second step of decomposing and depositing an organic gas, using a focused energy beam, to form an axially extending columnar structure on a predetermined part of the foundation; a third step of attaching and fixing a pre-formed nanotube to the columnar structure so that the nanotube extends axially in the same direction as the columnar structure; and a fourth step of imparting electrical conductivity between the attached nanotube and an electrode.

13. A method for fabricating a nanometer-scale structure as claimed in claim 11 or 12;
   wherein the focused energy beam is a focused ion beam.

14. A method for fabricating a nanometer-scale structure as claimed in claim 11 or 12;
   wherein the focused energy beam is a focused electron beam.

15. A method for fabricating a nanometer-scale structure as claimed in claim 11 or 12;
   wherein the columnar structure in the second step is formed by scanning or by repeatedly scanning the focused energy beam in the planar direction of the substrate, thereby decomposing the organic gas and depositing the decomposed residue so that it grows in the planar direction of the substrate.

16. A method for fabricating a nanometer-scale structure as claimed in claim 11 or 12;
   wherein the columnar structure in the second step is formed by scanning or by repeatedly scanning the focused energy beam in the planar direction of the substrate, either from a tilted upper or lower direction with respect to the planar direction of the substrate, or in a state in which the substrate is tilted, thereby decomposing the organic gas and depositing the decomposed residue so that it grows in the upper or lower direction of the substrate.

17. A method for fabricating a nanometer-scale structure as claimed in claim 11 or 12;
   wherein, in the second step, the columnar structure is formed by fixing the focused energy beam so that it is irradiated in such a manner that the direction of the incident focused energy beam is vertical or tilted at a constant angle with respect to the surface of the substrate, thereby decomposing the organic gas and depositing the decomposed residue so that it grows vertically or tilted at a constant angle with respect to the surface of the substrate.

18. A method for fabricating a nanometer-scale structure as claimed in claim 11 or 12;
   wherein the raw material for the organic gas is phenanthrene or one of $W(CO)_6$, $Cu(hfac)_2$ (where hfac: hexafluoro-acetyl-acetonate), $(CH_3)_2AlH$, $Al(CH_2-CH)(CH_3)_2$, $[(CH_3)_3Al]_2$, $(C_2H_5)_3Al$, $(CH_3)_3Al$, $(i-C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CR_3)_2$, $(CR_3)_4Sn$, $(C_2H_5)_4Sn$, $Nb(OC_2H_5)_5$, $Ti(i-OC_3H_7)_4$, $Zr(C_{11}H_{19}O_2)_4$, $La(C_{11}H_{19}O_2)_3$, $Sr(Ta(OC_2H_5)_6)_2$, $Sr(Ta(OC_2H_5)_5(OC_2H_4OCH_3))_2$, $Mn(OiC_3H_7)_2Zr(OtC_4H_9)$, $Zr(OiC_3H_7)$, $Ti(OiC_3H_7)_2(C_{11}H_{19}O_2)_2$, $Ta(OiC_3H_7)$, $Nb(OiC_3H_7)$, $Ge(OC_2H_5)$, $Pt(C_5H_4C_2H_5)(CH_3)_3$, $Ti(N(CH_3))_4$, $Ti(N(C_2H_5)_2)_4$, $Fe(OCH_3)_3$, $Ga(OCH_3)$, $Hf(OCH_3)_4$, $In(OCH_3)_3$, $Si(OC_2H_5)$, $Yb(OiC_3H_7)$, and $Zn(OCH_3)_3$.

19. A method for fabricating a nanometer-scale structure as claimed in claim 11 or 12;
   wherein, as a means for implementing the fourth step, a low melting point metal is coated to a joint between the nanotube and the electrode while controlling the temperature of the electrode, thereby improving the electric conductivity.

20. A method for fabricating a nanometer-scale structure as claimed in claim 19;
   Ga, In or another metal, or a solder or another alloy is used as the low melting point metal.

21. A method for fabricating a nanometer-scale structure as claimed in claim 19;
   the coating of the low melting point metal is carried out by attaching a probe covered with the low melting point metal to an atomic force microscope, bringing the probe into contact with the joint between the nanotube and the electrode, and applying an electric field between the joint and the probe covered with the low melting point metal, thereby allowing the low melting point metal to melt and deposit on the joint.

22. A method for fabricating a nanometer-scale structure as claimed in claim 11 or 12;
   wherein the nanometer-scale structure is a connecting wire among two or more facing electrodes.

23. A method for fabricating a nanometer-scale structure as claimed in claim 11 or 12;
   wherein the nanometer-scale structure is an active element comprised of a connecting wire among two or more facing electrodes and a gate electrode.

24. A method for fabricating a nanometer-scale structure as claimed in claim 11 or 12;
   wherein the nanometer-scale structure is an electrically conductive probe of a probe microscope.

* * * * *